(12) United States Patent
Holder

(10) Patent No.: US 10,652,379 B2
(45) Date of Patent: May 12, 2020

(54) HANDS-FREE MOUNT FOR MOBILE DEVICES

(71) Applicant: Josh Holder, Westminster, CO (US)

(72) Inventor: Josh Holder, Westminster, CO (US)

( * ) Notice: Subject to any disclaimer, the term of this patent is extended or adjusted under 35 U.S.C. 154(b) by 0 days.

(21) Appl. No.: 16/298,161

(22) Filed: Mar. 11, 2019

(65) Prior Publication Data
US 2019/0208047 A1 Jul. 4, 2019

Related U.S. Application Data

(63) Continuation of application No. 15/867,466, filed on Jan. 10, 2018, now Pat. No. 10,237,384, which is a continuation-in-part of application No. 15/452,342, filed on Mar. 7, 2017, now abandoned.

(60) Provisional application No. 62/340,732, filed on May 24, 2016, provisional application No. 62/305,869, filed on Mar. 9, 2016.

(51) Int. Cl.
*F16B 1/00* (2006.01)
*H04M 1/11* (2006.01)
*B60R 11/02* (2006.01)
*H04M 1/04* (2006.01)
*B60R 11/00* (2006.01)

(52) U.S. Cl.
CPC .......... *H04M 1/11* (2013.01); *B60R 11/0241* (2013.01); *H04M 1/04* (2013.01); *B60R 2011/0003* (2013.01); *B60R 2011/0033* (2013.01); *B60R 2011/0057* (2013.01); *B60R 2011/0078* (2013.01); *F16B 2001/0035* (2013.01)

(58) Field of Classification Search
None
See application file for complete search history.

(56) References Cited

U.S. PATENT DOCUMENTS

| 4,319,097 A | 3/1982 | Liautaud |
| 4,419,794 A * | 12/1983 | Horton, Jr. ................ A45F 5/02 |
| | | 224/197 |
| 5,992,807 A | 11/1999 | Tarulli |
| | (Continued) | |

OTHER PUBLICATIONS

Screenshots of video (full video currently available at https://www.youtube.com/watch?v=kdR8KvBnN1U&feature=youtu.be&app=desktop), published on Jun. 1, 2012, 6 pages.

(Continued)

*Primary Examiner* — Monica E Millner
(74) *Attorney, Agent, or Firm* — Trenner Law Firm, LLC; Mark D. Trenner

(57) ABSTRACT

A hands-free mount for a mobile device. An example hands-free mount includes a first magnetic attachment for combining with the mobile device, and a second mating magnetic attachment for combining with the first magnetic attachment. In an example, the hands-free mount includes a housing for the second mating magnetic attachment. A strap may be fitted through the opening in the housing to secure the housing to an object for attaching the mobile device to the object via magnetic connection of the first magnetic attachment on the mobile device to the second mating magnetic attachment of the housing. An example hands-free mount may also include a kickstand on the housing. The kickstand in the open position supports the mobile device in a substantially upright position. The kickstand folds into the closed position for carrying the mobile device.

19 Claims, 17 Drawing Sheets

(56) References Cited

U.S. PATENT DOCUMENTS

| | | | |
|---|---|---|---|
| 6,888,940 B1 | 5/2005 | Deppen | |
| 7,374,142 B2 | 5/2008 | Carneva | |
| 8,328,055 B1 | 12/2012 | Snyder | |
| 8,428,664 B1 * | 4/2013 | Wyers | F16M 13/04 455/575.1 |
| 8,567,832 B2 * | 10/2013 | Kannaka | A45F 5/00 224/218 |
| 8,662,362 B1 * | 3/2014 | Bastian | H04B 1/3888 224/197 |
| 8,706,175 B2 | 4/2014 | Cho | |
| D721,373 S * | 1/2015 | Logereau | D14/432 |
| 8,936,222 B1 | 1/2015 | Bastian et al. | |
| 8,950,638 B2 * | 2/2015 | Wangercyn, Jr. | H04B 1/385 224/217 |
| 8,979,398 B2 | 3/2015 | Han et al. | |
| 9,185,954 B2 | 11/2015 | Cheung et al. | |
| 9,300,346 B2 * | 3/2016 | Hirsch | H04B 1/385 |
| 9,314,092 B2 * | 4/2016 | Wang | A45F 5/00 |
| 9,372,507 B2 * | 6/2016 | Dekock | G06F 1/166 |
| 9,379,759 B2 | 6/2016 | Platt | |
| 9,407,743 B1 | 8/2016 | Hirshberg | |
| 9,427,070 B1 | 8/2016 | Bastian et al. | |
| 9,513,665 B2 * | 12/2016 | Magi | G06F 1/163 |
| 9,616,821 B2 | 4/2017 | Elharar | |
| 9,622,557 B1 * | 4/2017 | Beavers | A45F 5/00 |
| 9,706,829 B2 | 7/2017 | Tilney | |
| 9,866,663 B2 | 1/2018 | Kim | |
| 9,894,192 B2 | 2/2018 | Cox, III | |
| 9,926,953 B2 * | 3/2018 | Russell-Clarke | A45C 13/1069 |
| 9,954,569 B2 | 4/2018 | Murphy et al. | |
| 10,103,768 B2 | 10/2018 | Virolainen et al. | |
| 10,134,517 B2 * | 11/2018 | Baca | H01F 7/0252 |
| 10,455,927 B2 * | 10/2019 | Brousseau | B25G 1/02 |
| 2007/0029359 A1 * | 2/2007 | Smith | B60R 11/02 224/276 |
| 2009/0017883 A1 | 1/2009 | Lin | |
| 2010/0081377 A1 | 4/2010 | Chatterjee et al. | |
| 2010/0142130 A1 | 6/2010 | Wang et al. | |
| 2011/0024470 A1 * | 2/2011 | Hajarian | B60R 11/0241 224/276 |
| 2011/0192857 A1 | 8/2011 | Rothbaum et al. | |
| 2011/0266316 A1 | 11/2011 | Ghalib et al. | |
| 2012/0031937 A1 * | 2/2012 | Baker | A45C 11/00 224/217 |
| 2013/0277237 A1 | 10/2013 | Wang | |
| 2014/0091116 A1 * | 4/2014 | Yu | A45F 5/00 224/218 |
| 2014/0191096 A1 | 7/2014 | Wiercinski et al. | |
| 2014/0268517 A1 | 9/2014 | Moon et al. | |
| 2014/0299739 A1 | 10/2014 | Bradow | |
| 2014/0333828 A1 | 11/2014 | Han et al. | |
| 2014/0354218 A1 | 12/2014 | Kaynar et al. | |
| 2015/0057050 A1 | 2/2015 | Park et al. | |
| 2015/0115112 A1 * | 4/2015 | Noh | A45F 5/021 248/126 |
| 2015/0229874 A1 | 8/2015 | Sandy | |
| 2015/0320168 A1 | 11/2015 | Hoffman | |
| 2015/0342324 A1 | 12/2015 | Zhao | |
| 2016/0028947 A1 | 1/2016 | Wexler et al. | |
| 2016/0036480 A1 | 2/2016 | Hirsch | |
| 2016/0051019 A1 | 2/2016 | Sirichai | |
| 2016/0072933 A1 | 3/2016 | Cox, III | |
| 2016/0125988 A1 | 5/2016 | Lee | |
| 2016/0150861 A1 | 6/2016 | Yao et al. | |
| 2016/0260532 A1 | 9/2016 | Baca | |
| 2017/0264725 A1 | 9/2017 | Holder | |
| 2018/0131794 A1 | 5/2018 | Holder | |

OTHER PUBLICATIONS

Screen print from Amazon link http://amzn.to/Oe9HC3 from video, printed from Internet on Feb. 24, 2017, 4 pages.

Screenshot of video (full video currently available at https://www.youtube.com/watch?v=HVajehsMFYo), published on Nov. 18, 2016, 1 page. Please watch entire video.

* cited by examiner

HANDS-FREE MOUNT FOR MOBILE DEVICES

CROSS REFERENCE TO RELATED APPLICATIONS

This application is a continuation of U.S. patent application Ser. No. 15/867,466 filed Jan. 10, 2018 for "Hands-Free Mount For Mobile Devices" of Josh Holder, which is a continuation-in-part of U.S. patent application Ser. No. 15/452,342 filed Mar. 7, 2017 for "Hands-Free Mount For Mobile Devices" of Josh Holder, which claims the priority benefit of U.S. Provisional Patent Application No. 62/305,869 filed Mar. 9, 2016 for "Hands-Free Mount For Mobile Devices" of Josh Holder, and U.S. Provisional Patent Application No. 62/340,732 filed May 24, 2016 for "Hands-Free Mount For Mobile Devices" of Josh Holder, each of which is incorporated by reference in its entirety as though fully set forth herein.

BACKGROUND

The mobile device has become more than simply a phone. Most mobile devices (also called "smart" phones) today are a small and powerful computing device. Even the camera has made exponential leaps in picture quality, making the photos and video taken on a mobile device rival that of other good quality cameras.

However, using the mobile device still requires the user to hold the mobile device while taking a picture or video. The so-called "selfie stick" seeks to address this issue, enabling a user to hold the mobile device far enough away so that the person holding the device can also be a part of the picture. But the user still must hold the camera (i.e., via the selfie stick). As such, the user cannot participate in other activities while taking a photo or video.

DETAILED DESCRIPTION

A hands-free mount is disclosed as it may be implemented with a mobile device. The hands-free mount includes a detachable magnetic backing that enables a user to mount their mobile device to any surface (e.g., any metallic or non-metallic surface). In an example, a thin piece of metal is inserted into the back of any case for a mobile device. This can then be paired with a detachable magnetic material. In another example, a thin piece of magnetic material is inserted into the back of the case for the mobile device to make the mobile device magnetic. This can then be paired (e.g., magnetically) with any metal material, including but not limited to a detachable metal plate.

In either example, the detachable backing can be positioned to an object so that the mobile device can be magnetically attached thereto, enabling the mobile device to be attached "hands-free" to any desired location. As such, the hands-free mount turns any mobile device (e.g., smart phone, tablet, or other device) into a body camera, so that the user can record hiking, biking, walking, or other event, hands-free. In addition, the mobile device (or other device) can be attached to other magnetic or non-magnetic surfaces for hands-free mounting. In an example, the hands-free mount enables the user to mount the mobile device without having to hold the mobile device, e.g., to take a photo or video with himself or herself in the photo or video, for use while driving, etc.

Before continuing, it is noted that as used herein, the terms "includes" and "including" mean, but is not limited to, "includes" or "including" and "includes at least" or "including at least." The term "based on" means "based on" and "based at least in part on."

Figure 1:
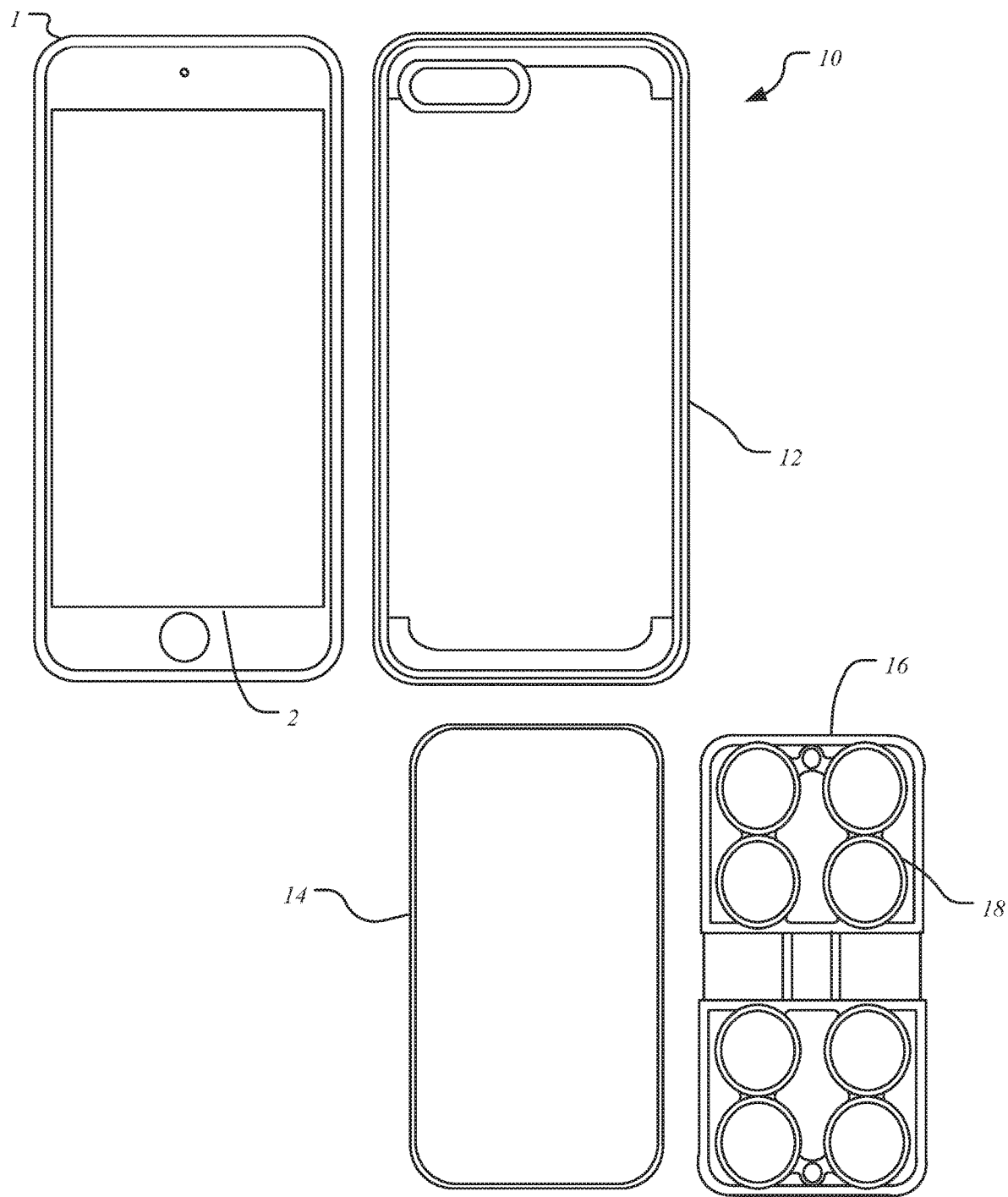
FIG. 1 shows an example hands-free mount for a mobile device.

FIG. 1 shows an example hands-free mount 10 for a mobile device 1 having a front 2 and a back 3. An example hands-free mount 10 for a mobile device 1 includes a ferromagnetic plate 14 and a magnetic plate 16 (e.g., having magnets 18). The plates 14 and 16 may be paired to mount the mobile device 1, e.g., for hands-free operation. For example, the plates 14 and 16 may be magnetically attachable at least in part to one another, and one of the plates 14 or 16 may be attachable at least in part to a surface so that the mobile device 1 can be attached to the surface.

It is noted that individual magnets 18 need not be provided. For example, the plate 16 may be a magnet or have a magnetic surface. It is also noted that either plate 14 or plate 16 may be combined with a case 12 of the mobile device 1, or otherwise mounted to the mobile device 1.

Figure 2A:
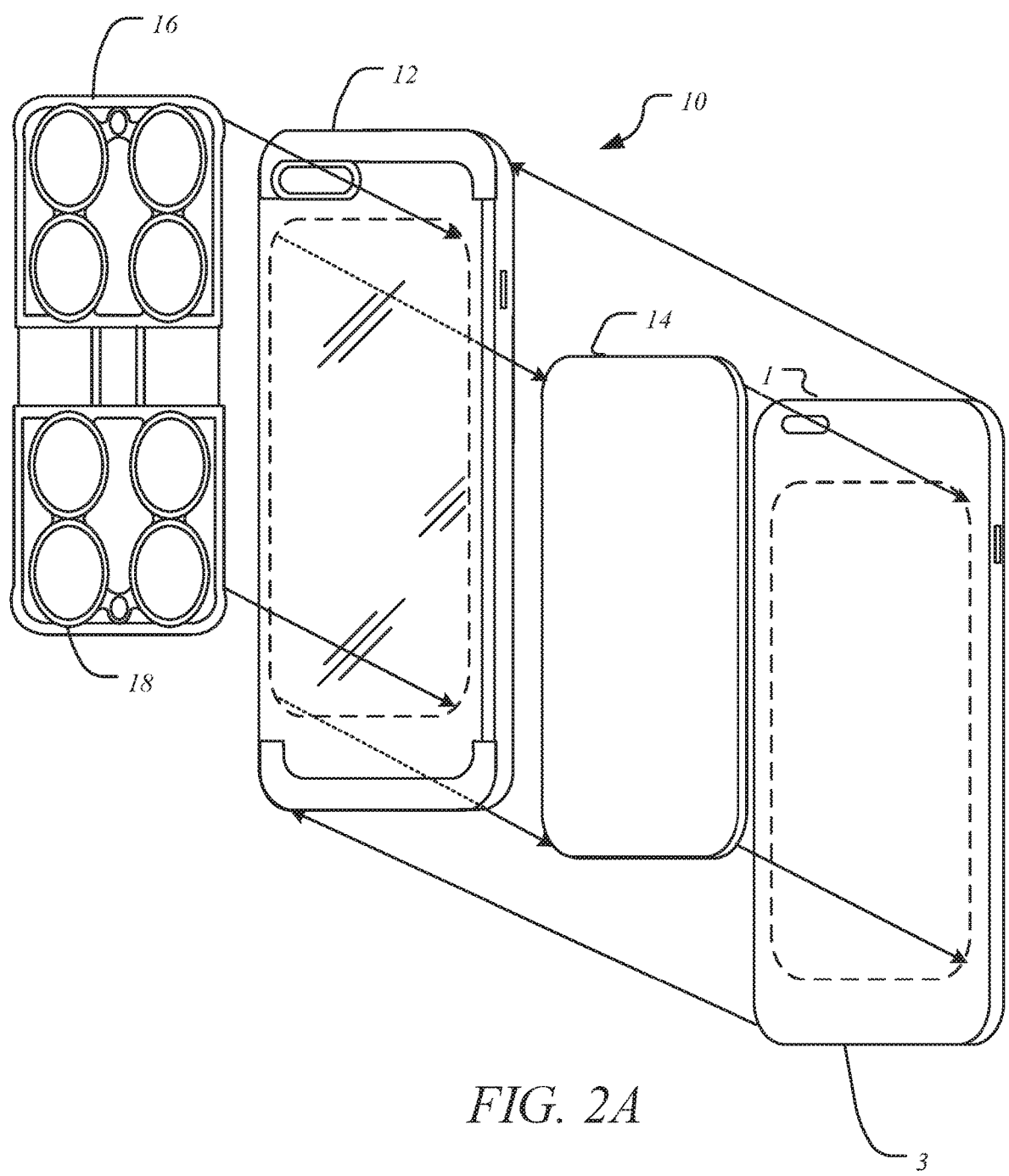
FIGS. 2A-B illustrate assembly of the example hands-free mount for a mobile device.
Figure 2B:
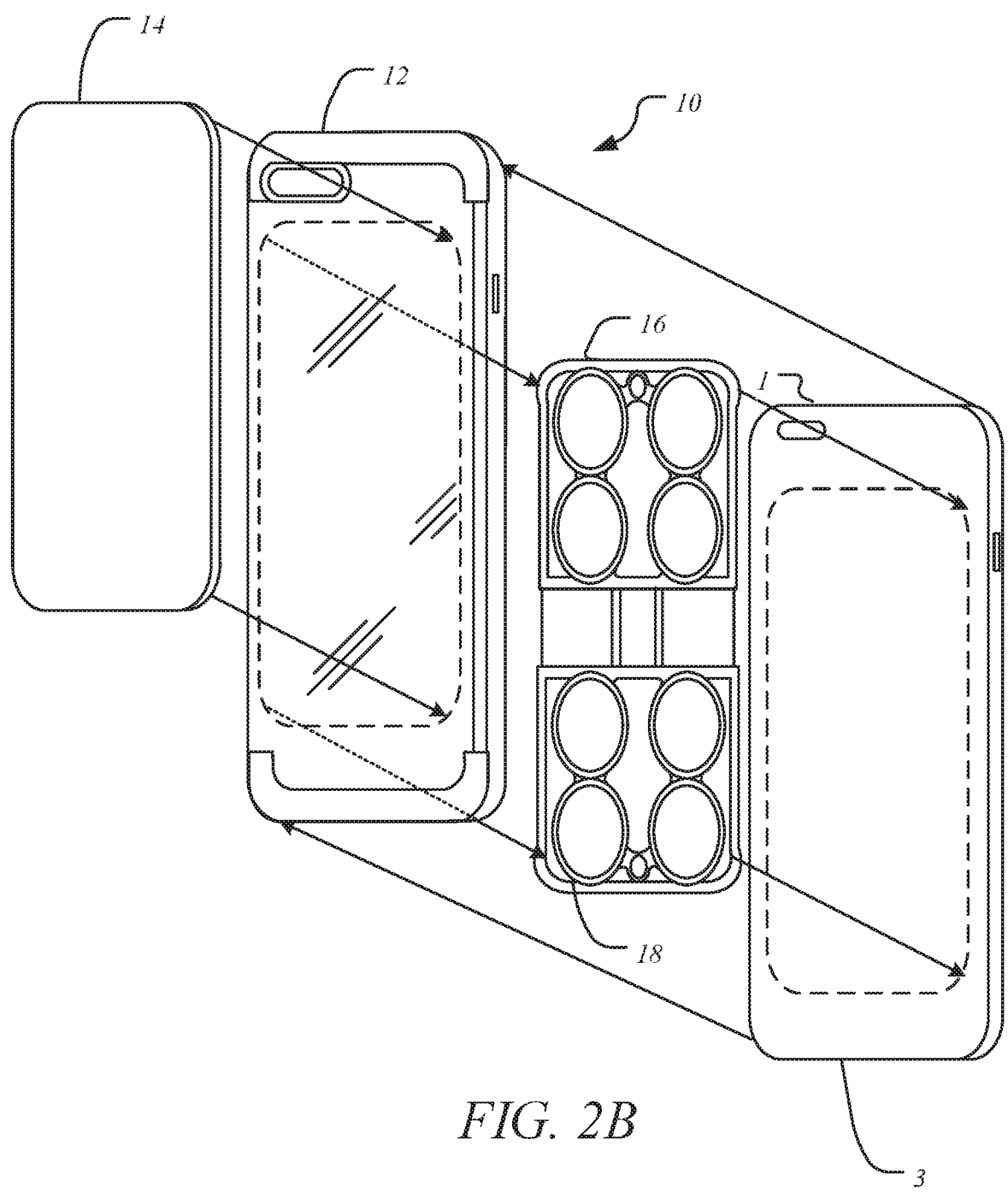

FIGS. 2A-B illustrate assembly of the example hands-free mount 10 for a mobile device 1. In an example, one of the plates 14 or 16 may be paired with the mobile device 1 via a case 12. For example, either of the plates 14 or 16 may be fitted behind the case 12, and attached to the mobile device 1 by attaching the case 12 to the mobile device 1.

FIG. 2A illustrates plate 14 being inserted between the case 12 and the mobile device 1. Plate 16 can be attached to any desired surface and paired with plate 14, thereby mounting the mobile device 1 to the surface.

FIG. 2B illustrates plate 16 being inserted between the case 12 and the mobile device 1. Plate 14 can be attached to any desired surface and paired with plate 16, thereby mounting the mobile device 1 to the surface.

In an example, the case 12 may be an aftermarket case (e.g., a protective case) for the mobile device 1. In another example, the case 12 may be the manufacturer casing of the phone (e.g., a battery cover).

In another example, one of the plates 14 or 16 includes an adhesive surface (e.g., is a "sticker"). As such, the plate (e.g., plate 14) having the adhesive surface can be adhered to the desired mounting surface so that the other plate (e.g., plate 16) can be paired with the adhesive plate and mounted to the surface. This may be desirable, for example, when the mounting surface does not have magnetic properties (e.g., plastic). In this example, the adhesive plate or "sticker" can be adhered to the plastic surface (e.g., the back of a computer monitor, discussed below), and then the mobile device 1 mounted to the sticker via the magnetic plate 16 on the mobile device 1.

Of course, it is noted that the "sticker" plate can be magnetic or ferromagnetic, and the opposite type of plate (e.g., ferromagnetic or magnetic, respectively) can be implemented on the mobile device 1.

Still other examples are contemplated, as will be readily understood by those having ordinary skill in the art after becoming familiar with the teachings herein. For example, the plate to be attached on the desired mounting surface and/or to the mobile device 1 (e.g., the cover 12) by a clip, clamp, button, snap, or any other suitable attachment, to attach the plate to the mounting surface so that the other plate (i.e., the plate on the mobile device 1) can be paired with the plate on the mounting surface to mount the mobile device 1 to the mounting surface.

FIGS. 3A-D illustrate operation of the example hands-free mount 10 for a mobile device 1. In an example illustrated by FIGS. 3A-D, ferromagnetic plate 14 is positioned behind the case 12 of the magnet device 1 (and therefore is not visible in FIGS. 3A-D), and the magnetic plate 16 is paired with the plate 14 so that it is removably attached to the outside of the case 12. In another example illustrated by FIGS. 3A-D, the plate 16 may be attached (e.g., pivotally or otherwise attached by button or snap, etc.) to the case 12.

Figure 3A:
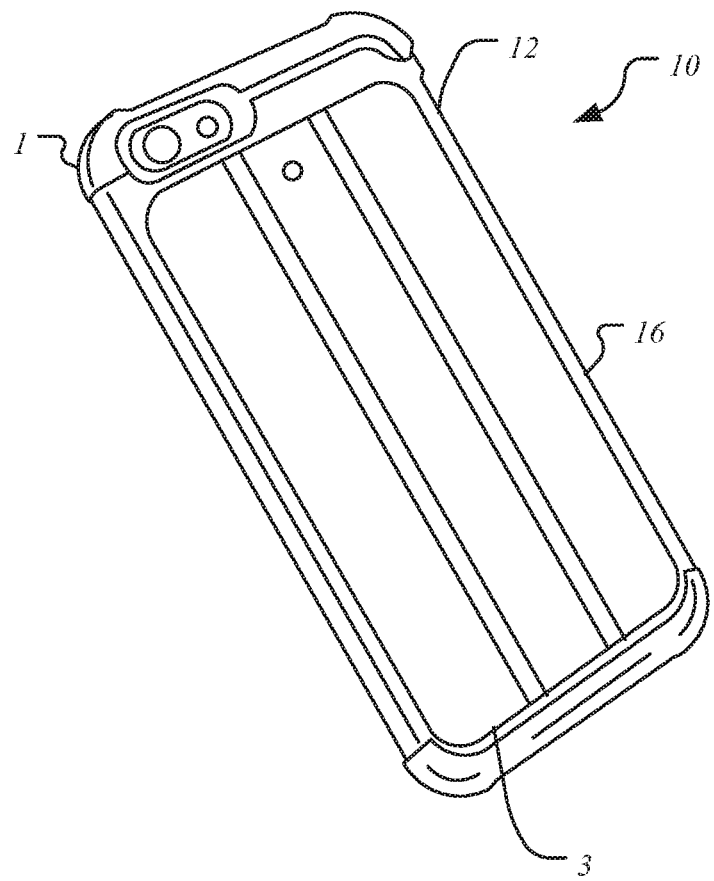
FIGS. 3A-D illustrate operation of the example hands-free mount for a mobile device.
Figure 3B:
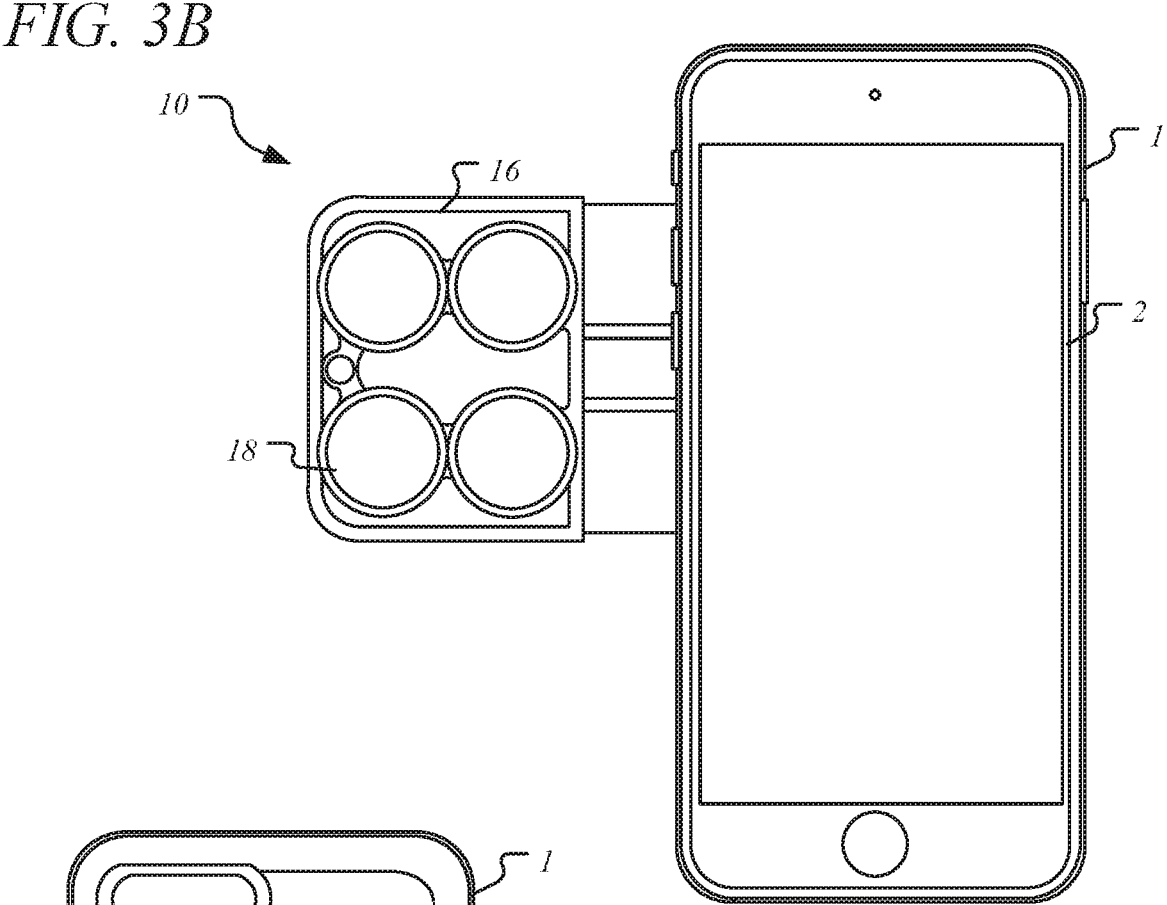
Figure 3C:
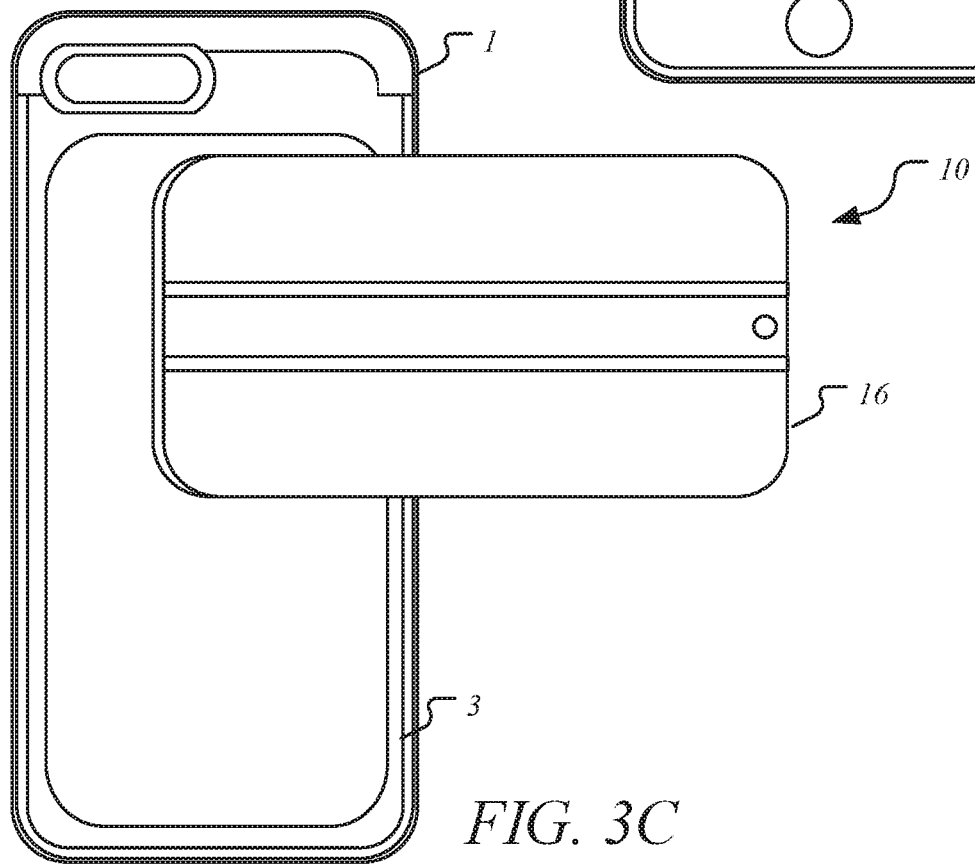
Figure 3D:
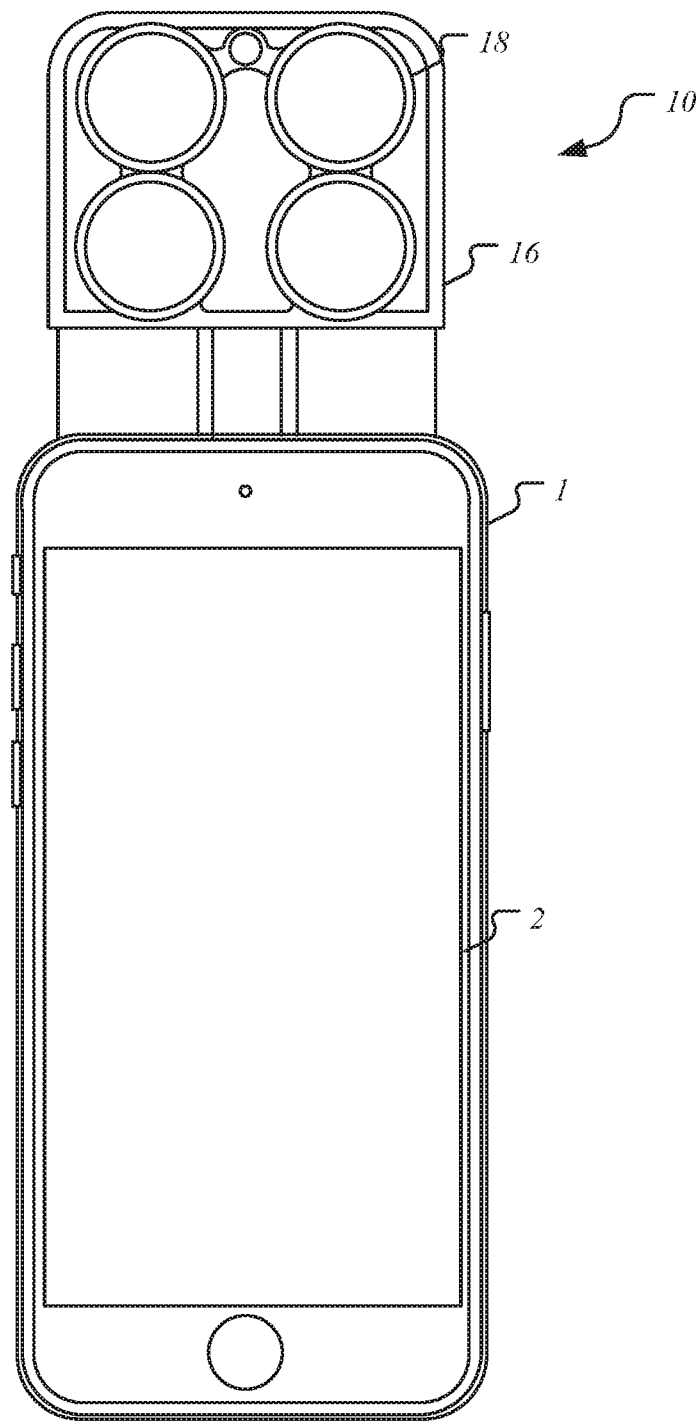

FIGS. 3B-3D illustrate the magnetic plate 16 as it may be rotated to various positions. In FIGS. 3B-C, the magnetic plate 16 is shown rotated to a side position. In FIG. 3D, the magnetic plate 16 is shown rotated to a top position. Although not shown, the magnetic plate 16 may also be rotated to a bottom position (i.e., opposite that shown in FIG. 3D).

It can be seen from the illustrations in FIGS. 3B-3D that the mobile device 1 can be mounted to a surface by pairing the exposed magnetic surface of plate 16 with a ferromagnetic surface. Examples are illustrated in FIG. 4E, discussed in more detail below.

Before continuing, it should be noted that the examples described above are provided for purposes of illustration, and are not intended to be limiting. Other devices and/or device configurations may be utilized to carry out the operations described herein.

FIGS. 4A-E illustrate example use-cases for the example hands-free mount for a mobile device. It is noted that the operations illustrated in the drawings are not intended to be limiting to any particular use case. Still other operations may also be implemented for any of a wide variety of different use cases.

Figure 4A:
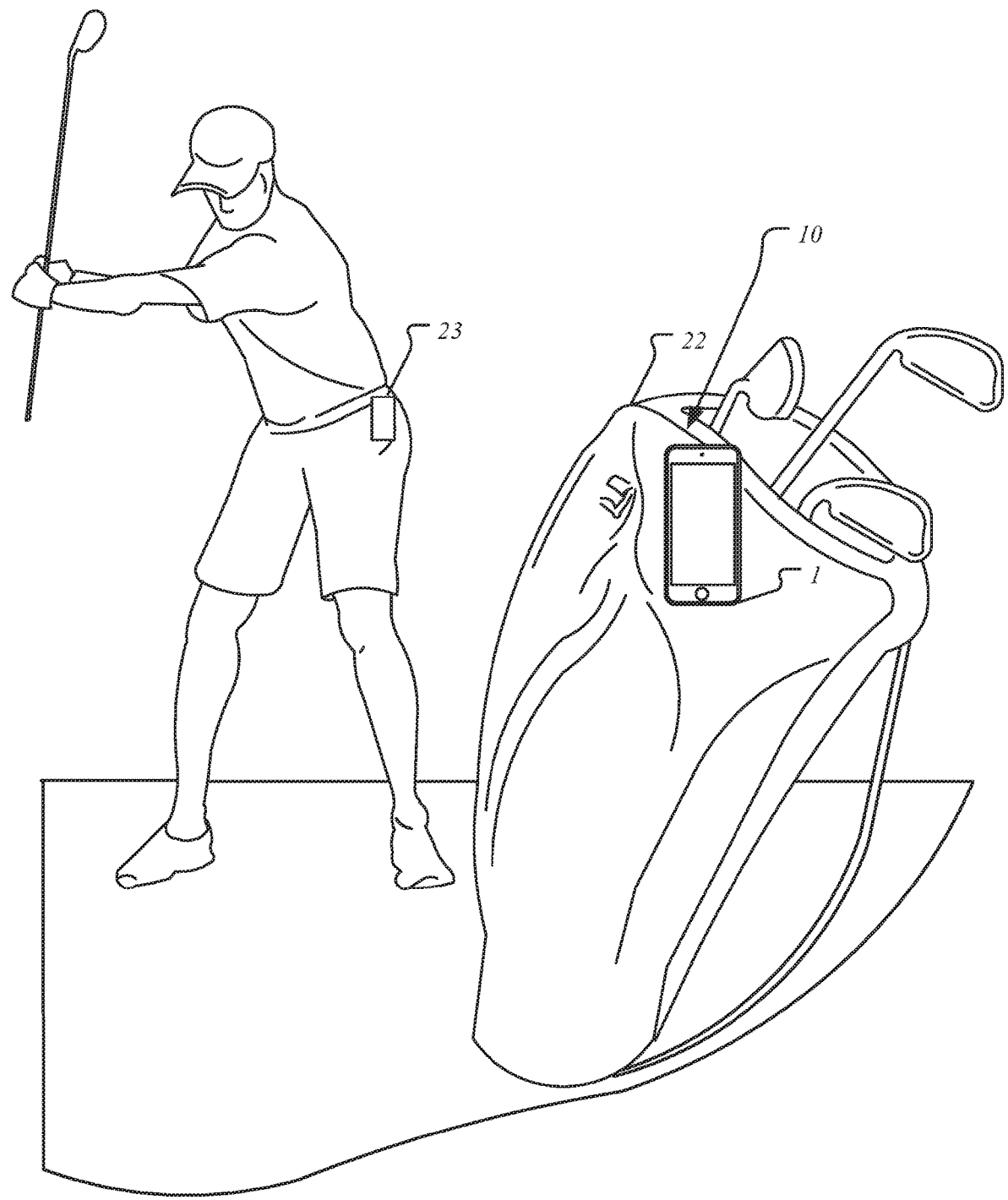
FIGS. 4A-E illustrate example use-cases for the example hands-free mount for a mobile device.

FIG. 4A shows an example hands-free mount 10 as it may be implemented to mount a mobile device 1 on a bag 22, such as a golf bag (although other bags or purses may also be used). In an example, one of the plates (e.g., magnetic plate 16) is positioned inside the bag 22, and the plates 14 and 16 are magnetically coupled through the bag 22 so that the mobile device 1 can be magnetically attached to the bag 22. This mode of operation may enable "hands-free" operation of the mobile device 1. A remote 23 (wired or wireless such as BLUETOOTH™) may be provided to control the mobile device 1 when the user steps away from the mobile device 1.

Figure 4B:
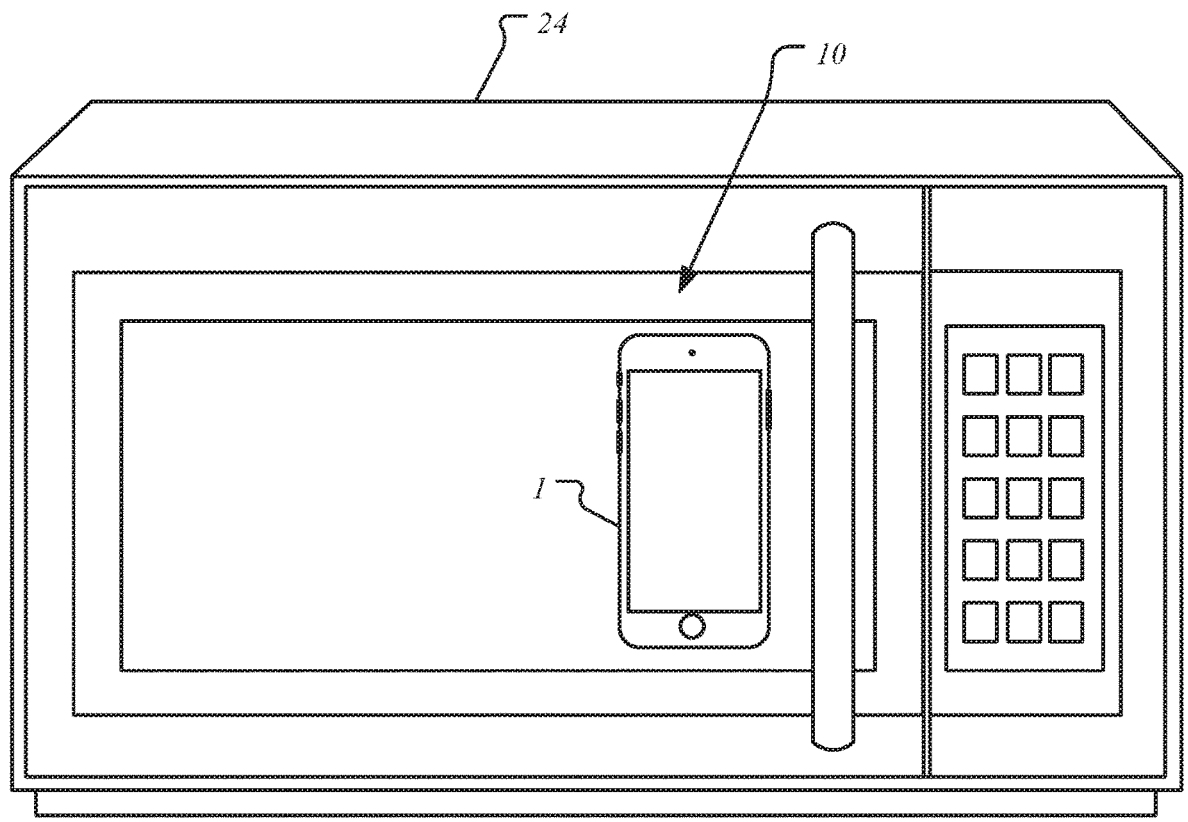
Figure 4C:
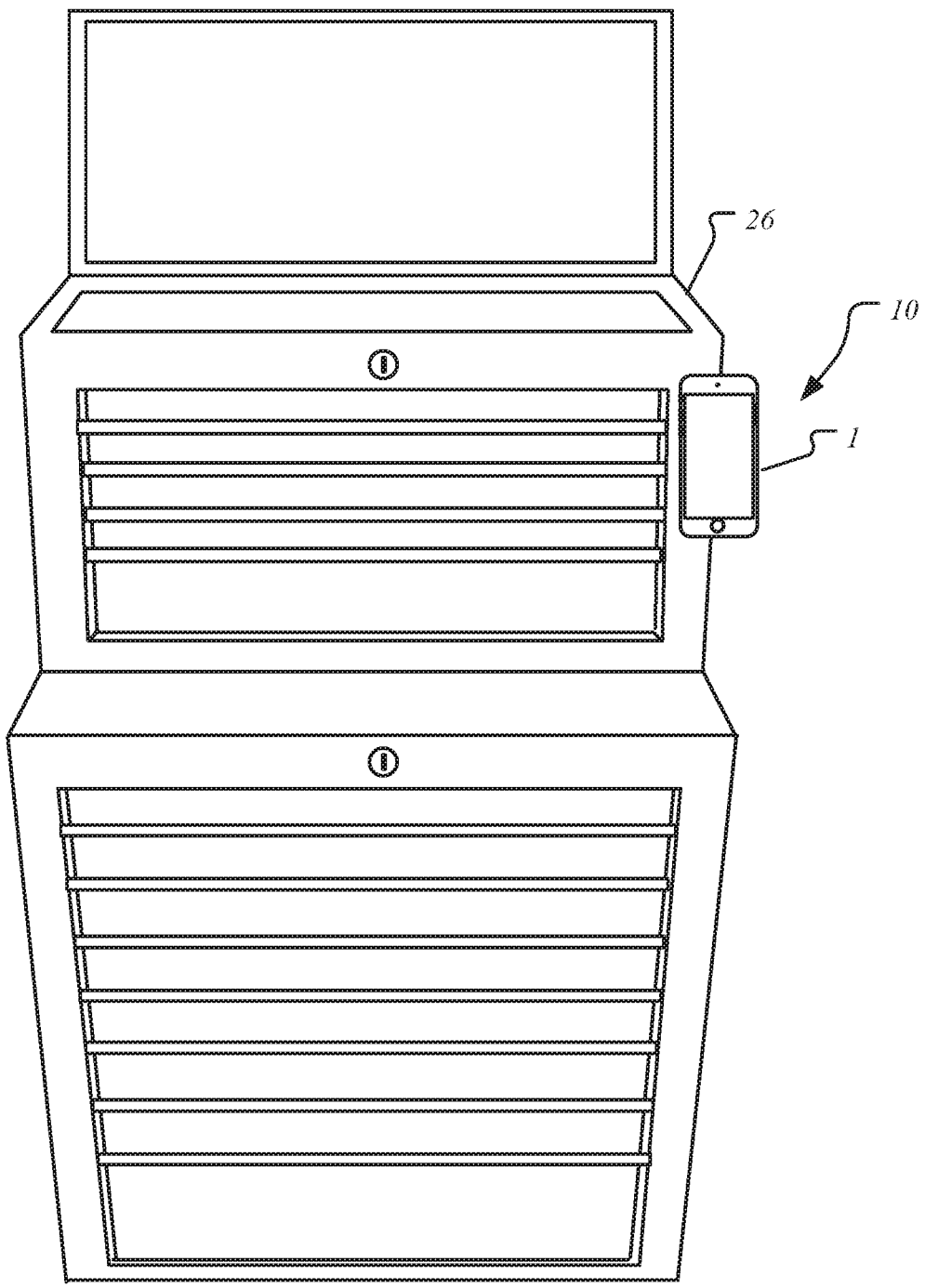

FIG. 4B shows an example hands-free mount 10 as it may be implemented to mount a mobile device 1 to a magnetic surface of an appliance 24, such as a microwave or refrigerator. FIG. 4C similarly shows the example hands-free mount 10 as it may be implemented to mount a mobile device 1 to a magnetic surface of a tool box 26. In these examples, the ferromagnetic plate 14 may not be used. Instead, the magnetic plate 16 is provided on the mobile device 1, such as between the cover 12 and the mobile device 1, and the magnetic plate 16 is magnetically coupled to the appliance 24 or tool chest 26 so that the mobile device 1 can be magnetically attached thereto. This mode of operation may enable "hands-free" operation of the mobile device 1.

Figure 4D:
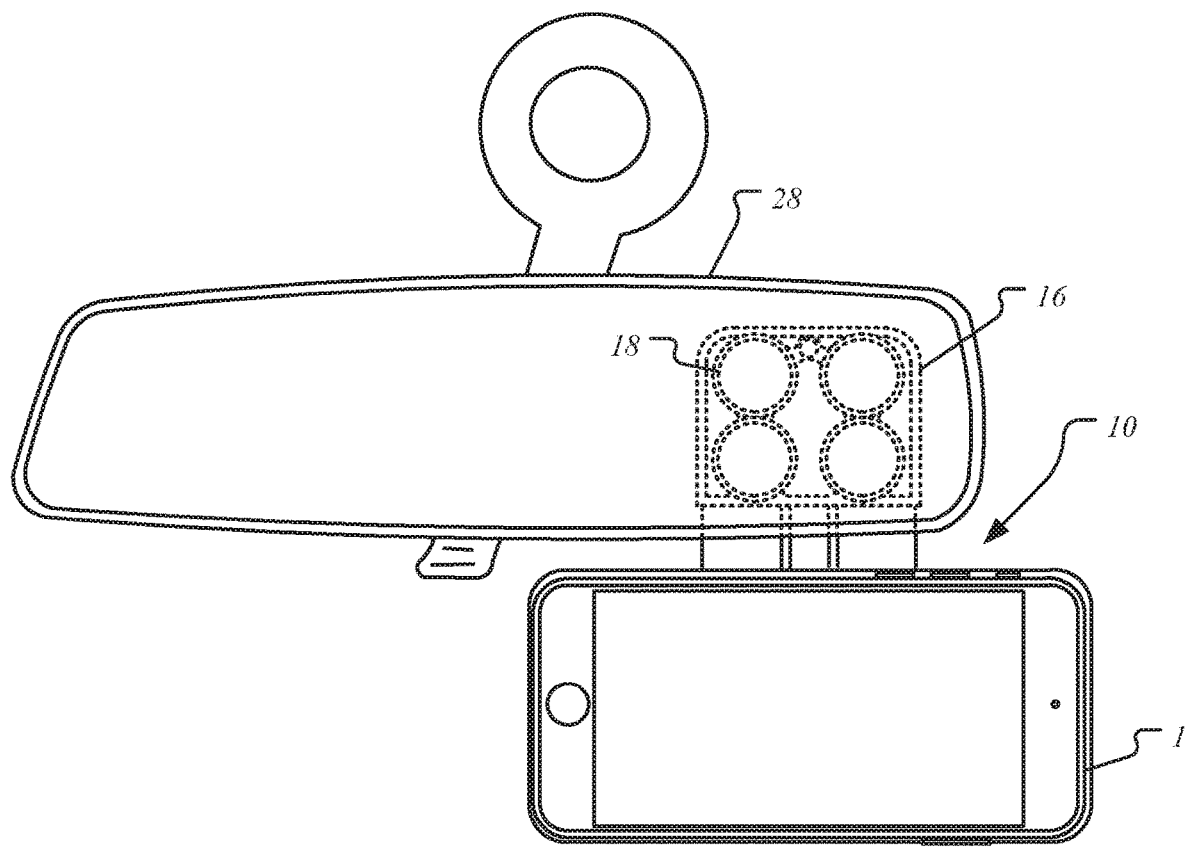
Figure 4E:
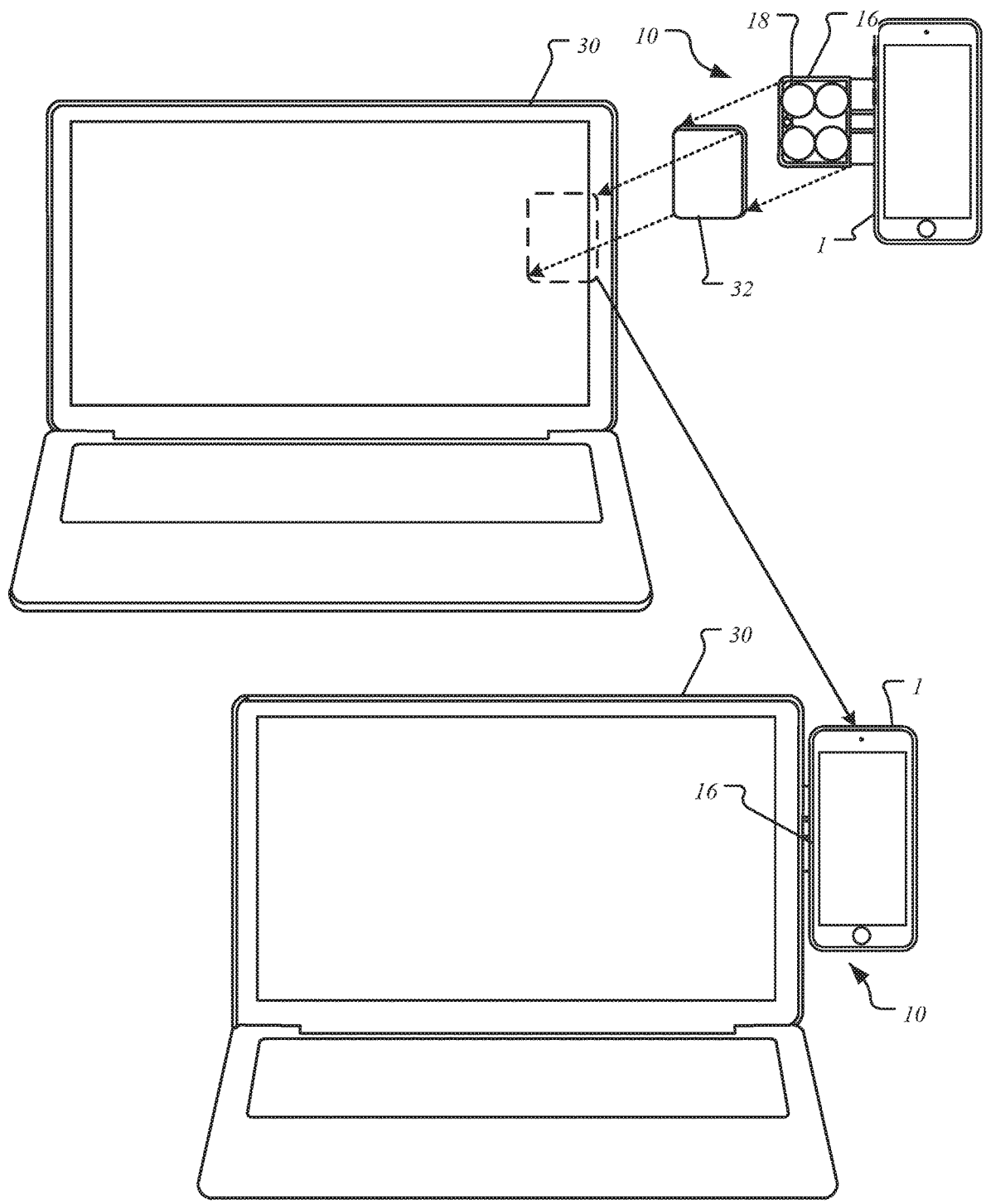

FIG. 4D shows an example hands-free mount 10 as it may be implemented to mount a mobile device 1 to a rear-view mirror 28 of an automobile. In this example, the ferromagnetic plate 14 may be provided on the mobile device 1, such as between the cover 12 and the mobile device 1, and the magnetic plate 16 is magnetically coupled to in part to the mobile device 1, and in part on the rear-view mirror 28. This mode of operation may enable "hands-free" operation of the mobile device 1, e.g., as a dash camera while driving.

FIG. 4E shows an example hands-free mount 10 as it may be implemented to mount a mobile device 1 to a laptop computer 30. In this example, the ferromagnetic plate 14 may be provided on the laptop computer 30 (e.g., as a metal "sticker" adhered to the monitor with an adhesive). The magnetic plate 16 is magnetically coupled to in part to the mobile device 1, and in part on the sticker to mount the mobile device 1 on or adjacent to the laptop computer 30.

The example use-cases shown in FIGS. 4A-E are illustrative only, and not intended to be limiting. Of course, the example hands-free mount may be implemented with any number of other devices, such as a tablet, television, cash register, etc. with or without a metal backing (e.g., using the magnetic or metal stickers). The example hands-free mount may be implemented for a wide variety of sports and/or other activities. The example hands-free mount may also be implemented on any type of surface, including but not limited to vehicles, boats, ski helmets, etc. with or without a metal backing (e.g., using the magnetic or metal stickers). Still other implementations are also contemplated, as will be readily understood by those having ordinary skill in the art after becoming familiar with the teaching herein.

Likewise, the hands-free mount 10 may be implemented with any of a variety of components. For example, the hands-free mount 10 may be implemented with or without a case 12 for the mobile device 1. For example, the plate may be attached (e.g., via adhesive) to the outside of the mobile device or to the case 12. This may be particularly desirable if the case 12 is thick, for example a LIFE CASE™ or an OTTER BOX™. The plate may also be attached (e.g., via adhesive) directly to the mobile device 1 itself. As such, the hands-free mount works well with any case, and even without a case.

Figure 5A:
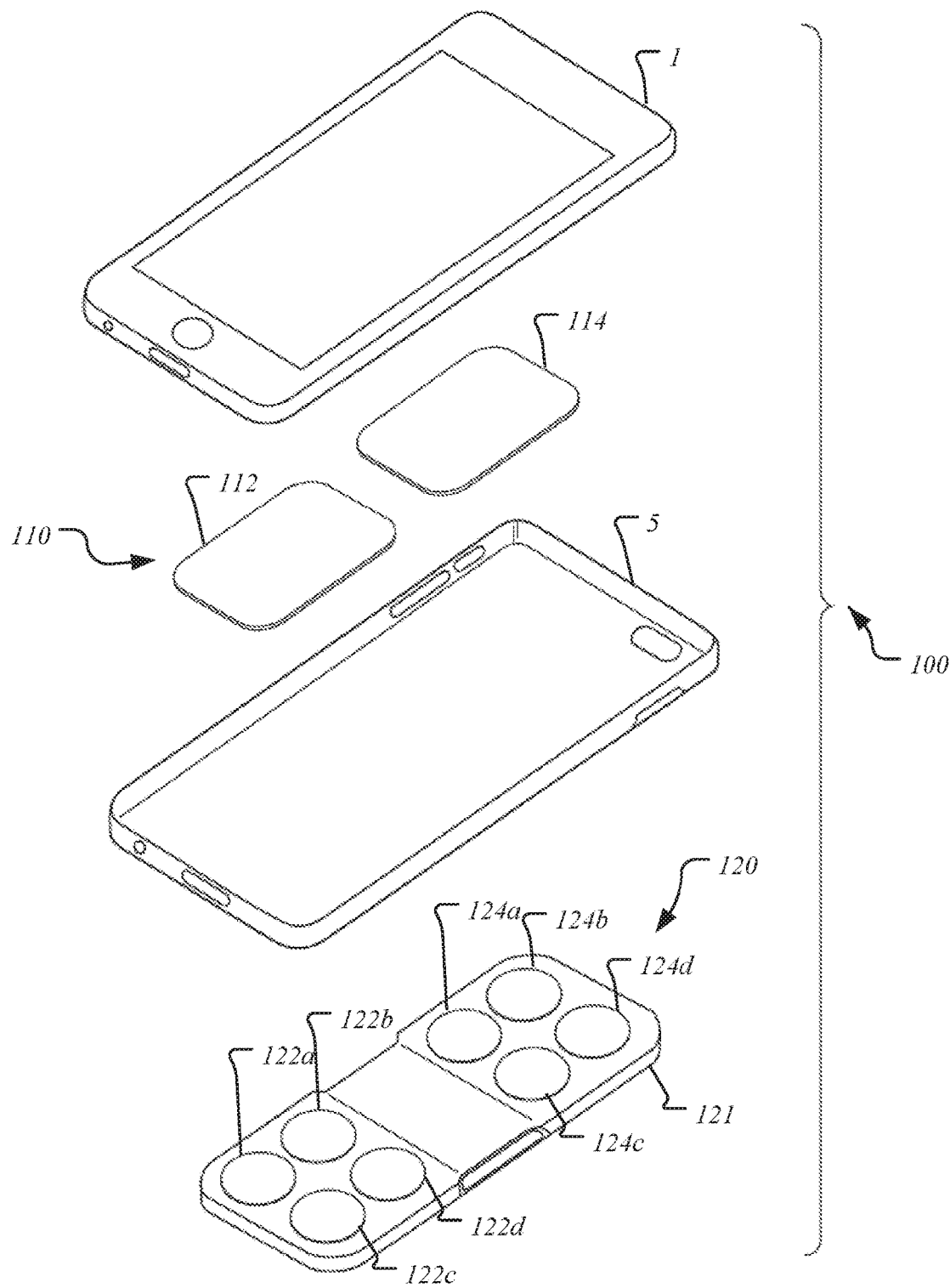
FIGS. 5A-C are exploded perspective views of another example hands-free mount for a mobile device.
Figure 5B:
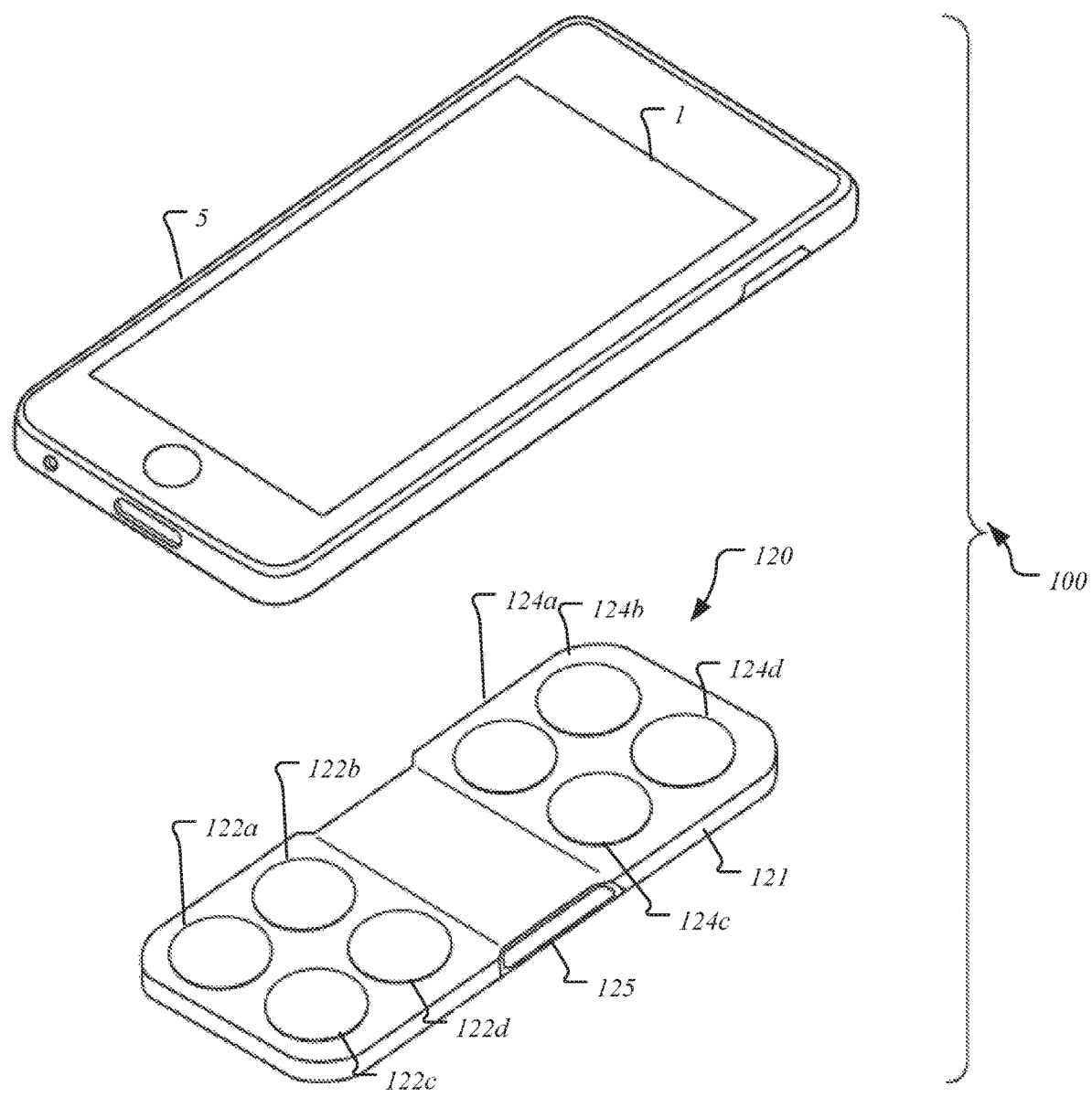
Figure 5C:
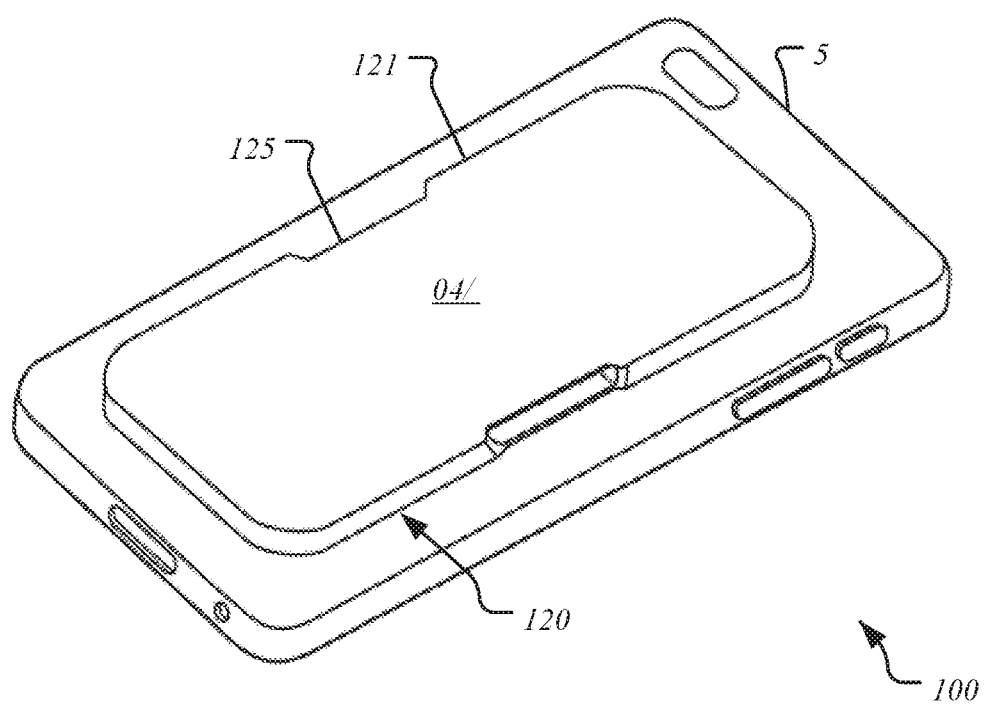

FIGS. 5A-C are exploded perspective views of another example hands-free mount 100 for a mobile device 1. The example hands-free mount 100 is a phone mount for active lifestyles. It works with most if not all mobile devices, with or without a case. The example hands-free mount 100 is a sleek removable magnetic back for smartphones and tablets (like a backpack) that allows the user to mount a phone/tablet or other mobile device almost anywhere.

An example hands-free mount 100 includes a first magnetic attachment 110 for combining with the mobile device 1. In an example, the first magnetic attachment 110 may include a plurality of attachment components. For example, two components 112 and 114 are shown in FIG. 5A. However, a single component or more than two components may also be provided.

In an example, the first magnetic attachment 110 is combined with the mobile device 1 inside a cover 5 for the mobile device 1. In another example, the first magnetic attachment 110 adheres directly to the mobile device. For example, the magnetic component may include a separate adhesive. Or for example, the first magnetic attachment 110 itself may be a sticker as described above.

By way of illustration, the components 112 and 114 may be a thin sticker that can be adhered to the back of any mobile device (or other device to be implemented). In this illustration, the components 112 and 114 are magnetic so that the mobile device 1 can be attached magnetically to any metal or other magnetic surface, such as the body of a vehicle, a metal pole, etc. In an example, a phone case can be positioned over the components 112 and 114 after the components 112 and 114 are adhered to the back of the mobile device 1. The magnetic action of the components 112 and 114 may operate through the phone case so that the mobile device 1 has the same look and feel of any mobile device without the components 112 and 114, but can now be attached to any metal or other magnetic surface.

The example hands-free mount 100 also includes a second mating magnetic attachment 120. In an example, the second mating magnetic attachment is provided in a housing 121. The second mating magnetic attachment 120 may include one or a plurality of magnetic components 122a-d and 124a-d. Any suitable configuration may be provided. However, the configuration shown in FIG. 5A enables pivotally mounting the first attachment 110 and second attachment 120. For example, the attachments 110 and 120 may be mounted substantially perpendicular to one another, as described above with reference to FIGS. 3B and 3C, or at any other desired angle relative to one another.

The second mating magnetic attachment 120 is for combining with the first magnetic attachment to mount the mobile device 1 on an object via magnetic connection. The magnetic connection enables the first magnetic attachment 110 and the second mating magnetic attachment 120 to be magnetically detachable and attachable with each other. For example, the first magnetic attachment 110 may have a magnetic material, and the second mating magnetic attachment 120 may have a ferromagnetic material. In another example, the first magnetic attachment 110 has a ferromagnetic material, and the second mating magnetic attachment 120 has a magnetic material.

In another illustration, the second mating magnetic attachment 120 is positionable behind a surface of the object (e.g., behind a shirt or other clothing article) so that the mobile device 1 can be magnetically attached to the object via the first magnetic attachment 110, through the surface of the object to the second mating magnetic attachment 120.

In an example, the surface of the object is a non-metallic article (e.g., clothing or other non-magnetic object), such that the second mating magnetic attachment 120 is positioned on or behind the surface of the object so that the mobile device can be magnetically attached to the object.

In another example, a strap can be positioned between the magnets 122a-d and the magnets 124a-d, either in the opening 125, or on the same surface as the magnets, but between each set of magnets, and then attached to the magnets 112 and 114 on the mobile device 1. By way of illustration, the mobile device 1 can then be attached to the strap of a backpack or the like.

In another example, the first magnetic attachment 110 is magnetically attached directly to the object (e.g., where the object is magnetic). As such, the mobile device 1 can be attached directly to the object without the second mating magnetic attachment 120.

Figure 6A:
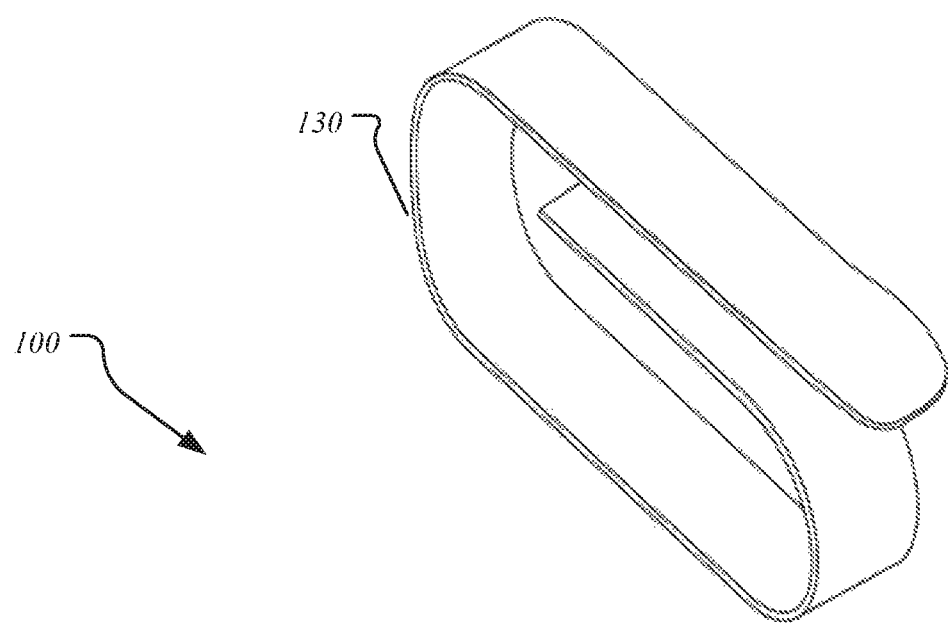
FIGS. 6A-B are rear perspective views of the example hands-free mount for a mobile device with a strap assembly.
Figure 6A:
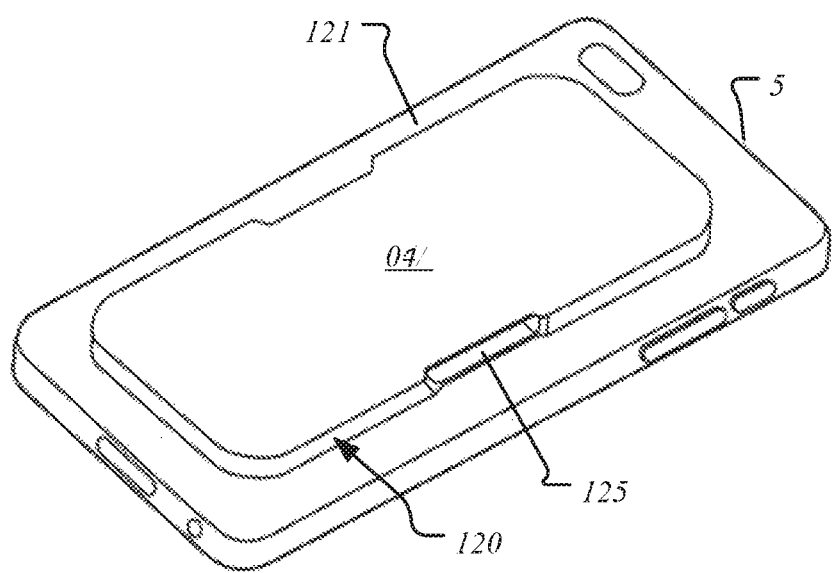
Figure 6B:
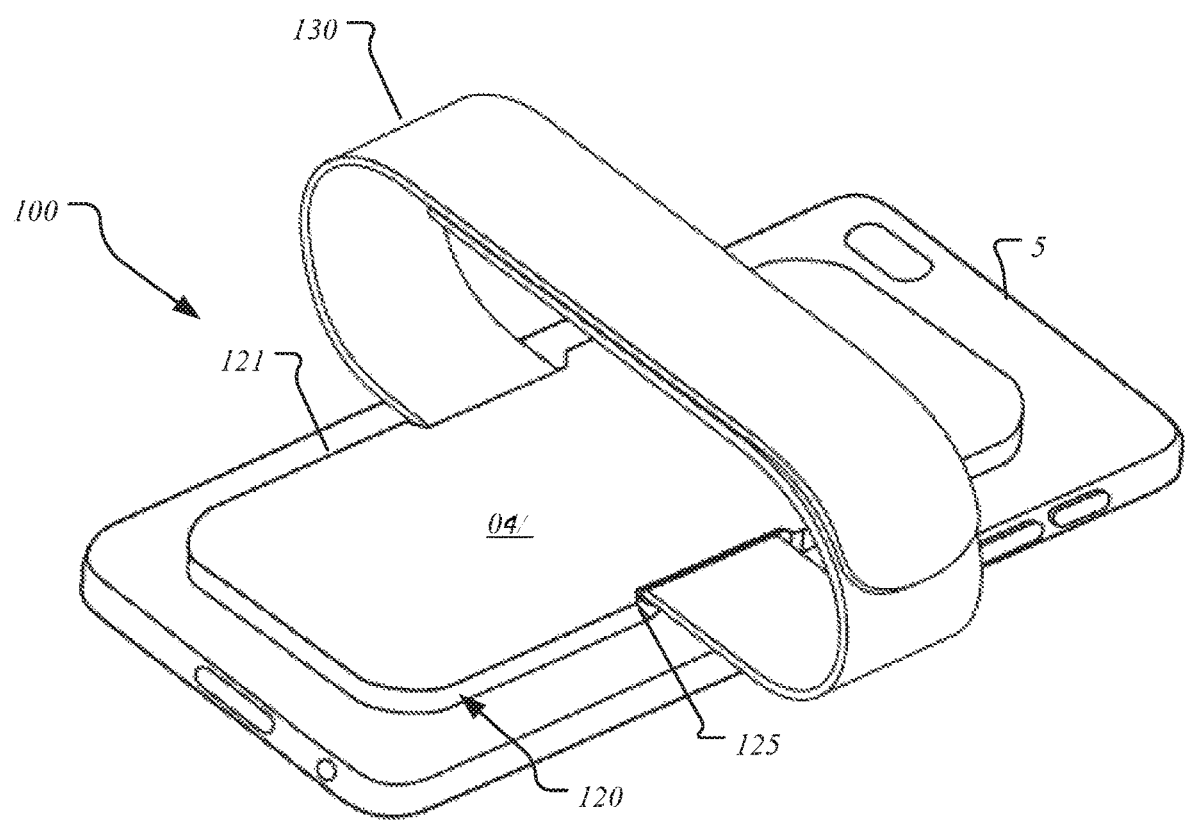

FIGS. 6A-B are rear perspective views of the example hands-free mount 100 for a mobile device 1 with a strap assembly 130. In an example, the housing 121 has an opening 125 formed through the housing 121. The opening 125 enables the housing 121 to receive a strap 130. The strap 130 may be implemented for securing the housing 121 to an object (e.g., a person's arm, a tree branch, etc.). As such, the strap 130 can be implemented for attaching the mobile device 1 to a non-magnetic object via a magnetic connection. That is, the magnetic connection formed between the first magnetic attachment 110 on the mobile device 1 to the second mating magnetic attachment 120 of the housing 121.

Figure 7A:
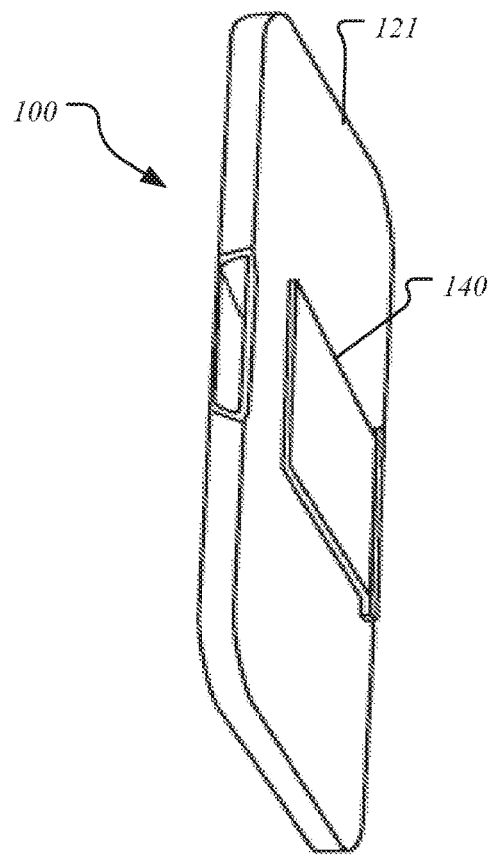
FIGS. 7A-B are perspective views of a magnetic base of the example hands-free mount for a mobile device with a kickstand in A) a closed position, and B) an open, propped up position.
Figure 7B:
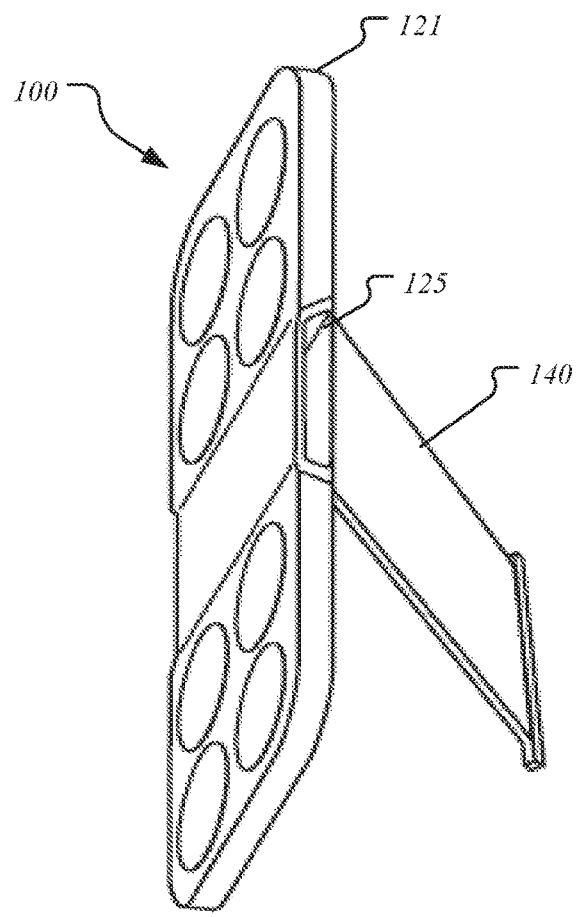

FIGS. 7A-B are perspective views of a magnetic base 120 of the example hands-free mount 100 for a mobile device 1 with a kickstand 140. The kickstand 140 is shown in FIG. 7A in a closed position. The kickstand 140 is shown in FIG. 7B in an open or "propped up" position.

In an example, the kickstand 140 is pivotally mounted (e.g., by hinge) on the housing 121. The kickstand 140 is operable between an open position and a closed position. In the open position, the kickstand 140 supports the mobile device 1 in a substantially upright position. The kickstand 140 folds into the closed position, e.g., for carrying the mobile device 1.

Other configurations are also contemplated. By way of illustration, the example hands-free mount 100 may include a thin "suction cup" material or "micro-suction" covering. The suction material may be provided on the side 150 of the housing 121 opposite the magnets 122a-d and 124a-d. The suction material enables the housing 121 to be mounted to glass, mirrors, or other smooth surface, e.g., by pressing the side 150 onto the smooth surface to create a suction on the smooth surface and thus mount the housing 121 to the smooth surface.

It is noted that the examples shown and described are provided for purposes of illustration and are not intended to be limiting. Still other examples are also contemplated.

The invention claimed is:

1. A hands-free mount for a mobile device, comprising:
a magnetic attachment to couple with the mobile device;
a magnetic base to magnetically engage and disengage with the magnetic attachment; and
a housing of the magnetic base, the housing having a channel formed through the housing between a first side edge on one side of the housing and a second side edge on an opposite side of the housing to receive a strap through the channel, the strap securing the housing to an object for attaching the mobile device to the object via magnetic connection of the magnetic attachment on the mobile device to the magnetic bases;
wherein the magnetic base is positionable behind a surface of the object so that the mobile device can be magnetically attached to the object through the surface of the object to a second mating magnetic attachment.

2. The hands-free mount of claim 1, wherein the magnetic attachment has a plurality of separate magnets.

3. The hands-free mount of claim 1, wherein the magnetic attachment is coupled with the mobile device by placement inside a cover of the mobile device.

4. The hands-free mount of claim 1, wherein the magnetic base has a plurality of magnetic components.

5. The hands-free mount of claim 1, further comprising a kickstand connected by hinge to the magnetic base to fold between an open position and a closed position.

6. The hands-free mount of claim 1, wherein the magnetic attachment has a magnetic material, and the magnetic base has a ferromagnetic material.

7. The hands-free mount of claim 1, wherein the magnetic attachment has a ferromagnetic material, and the magnetic base has a magnetic material.

8. The hands-free mount of claim 1, wherein the surface of the object is a non-metallic article, such that the magnetic base is positioned on or behind the surface of the object so that the mobile device can be magnetically attached to the object.

9. The hands-free mount of claim 1, wherein the magnetic attachment is magnetically attached to the object to attach the mobile device to the object without the magnetic base.

10. The hands-free mount of claim 1, wherein the magnetic attachment adheres to the mobile device.

11. The hands-free mount of claim 1, wherein the magnetic attachment is a sticker.

12. The hands-free mount of claim 1, herein the magnetic base is pivotally mounted to the magnetic attachment.

13. The hands-free mount of claim 1, further comprising:
a plurality of separate magnets on the magnetic attachment; and
a plurality of magnetic components on the magnetic base, each of the plurality of magnetic components on the magnetic base connecting with the plurality of separate magnets on the magnetic attachment when the magnetic base is attached to the magnetic attachment.

14. The hands-free mount of claim 13, wherein the magnetic base pivots about 90 degrees relative to the magnetic attachment to change an orientation of the mobile device between a portrait and landscape mode.

15. The hands-free mount of claim 14, wherein a first half of the plurality of magnetic components on the magnetic base remain connected with a first half of the plurality of separate magnets on the magnetic attachment when the magnetic base is attached to the magnetic attachment.

16. The hands-free mount of claim 15, wherein a second half of the plurality of magnetic components on the magnetic base are positioned away from a second half of the plurality of separate magnets on the magnetic attachment when the magnetic base is attached to the magnetic attachment.

17. The hands-free mount of claim 16, wherein the first half of the plurality of magnetic components on the magnetic base are positioned apart from the second half of the plurality of magnetic components on the magnetic base.

18. The hands-free mount of claim 17, wherein the first half of the plurality of magnetic components on the magnetic base include a plurality of magnets on a first end of the magnetic base, and the second half of the plurality of magnetic components on the magnetic base include another plurality of magnets on a second end of the magnetic base.

19. A hands-free mount for a mobile device, comprising:
a magnetic attachment to couple with the mobile device;
a magnetic base to magnetically engage and disengage with the magnetic attachment; and
a housing of the magnetic base, the housing having a channel formed through the housing between a first side edge on one side of the housing and a second side edge on an opposite side of the housing to receive a strap through the channel, the strap securing the housing to an object for attaching the mobile device to the object via magnetic connection of the magnetic attachment on the mobile device to the magnetic base;
a plurality of separate magnets on the magnetic attachment; and
a plurality of magnetic components on the magnetic base, each of the plurality of magnetic components on the magnetic base connecting with the plurality of separate magnets on the magnetic attachment when the magnetic base is attached to the magnetic attachment;
wherein the magnetic base pivots about 90 degrees relative to the magnetic attachment to change an orientation of the mobile device between a portrait and landscape mode.

* * * * *